(12) United States Patent
Stokman et al.

(10) Patent No.: US 12,483,019 B2
(45) Date of Patent: Nov. 25, 2025

(54) DC CIRCUIT PROTECTION DEVICE FOR ENHANCED SELECTIVITY

(71) Applicant: DC Systems B.V., Aalsmeer (NL)

(72) Inventors: Henricus David Stokman, Aalsmeer (NL); Panagiotis Kolios, Alphen aan den Rijn (NL)

(73) Assignee: DC Systems B.V., Aalsmeer (NL)

( * ) Notice: Subject to any disclaimer, the term of this patent is extended or adjusted under 35 U.S.C. 154(b) by 209 days.

(21) Appl. No.: 18/143,107

(22) Filed: May 4, 2023

(65) Prior Publication Data

US 2023/0361551 A1 Nov. 9, 2023

Related U.S. Application Data

(60) Provisional application No. 63/338,893, filed on May 6, 2022.

(51) Int. Cl.
*H02H 3/087* (2006.01)
*H02H 1/00* (2006.01)

(52) U.S. Cl.
CPC .......... *H02H 3/087* (2013.01); *H02H 1/0007* (2013.01)

(58) Field of Classification Search
CPC ........ H02H 3/087; H02H 1/0007; H02H 1/06; H02H 7/268; H02H 3/021; H02H 3/05; H02H 7/00; H02H 7/28; H02J 1/00
See application file for complete search history.

(56) References Cited

U.S. PATENT DOCUMENTS

| | | | |
|---|---|---|---|
| 11,837,864 B2* | 12/2023 | Schierling | H02H 7/266 |
| 11,909,203 B2* | 2/2024 | Stokman | H02J 1/08 |
| 2020/0203943 A1 | 6/2020 | Shen et al. | |
| 2022/0014185 A1* | 1/2022 | Handt | H03K 17/08148 |
| 2022/0102967 A1* | 3/2022 | Schierling | H02H 7/268 |
| 2022/0149610 A1 | 5/2022 | Beckert et al. | |
| 2023/0054222 A1* | 2/2023 | Stokman | H02J 1/04 |
| 2023/0216291 A1* | 7/2023 | Sim | H02M 1/34 |
| | | | 361/42 |

FOREIGN PATENT DOCUMENTS

| | | |
|---|---|---|
| DE | 102019203983 A1 | 9/2020 |
| EP | 4138246 A1 | 2/2023 |
| WO | 2016147179 A1 | 9/2016 |
| WO | 2020136017 A1 | 7/2020 |

OTHER PUBLICATIONS

Extended European Search Report dated Oct. 16, 2023 for corresponding European Patent Application No. 23169892.9-1202, 8 pages.

\* cited by examiner

*Primary Examiner* — Rexford N Barnie
*Assistant Examiner* — Nicolas Bellido
(74) *Attorney, Agent, or Firm* — Troutman Pepper Locke LLP

(57) ABSTRACT

Some embodiments provide a DC solid state protection device that includes a capacitor configured such that in the event of a short-circuit condition, the capacitor provides all the short-circuit current required for the solid state protection device to detect a current indicative of a short-circuit condition and to cause a solid state switch to be opened, thereby tripping the solid state protection device.

16 Claims, 11 Drawing Sheets

DC CIRCUIT PROTECTION DEVICE FOR ENHANCED SELECTIVITY

RELATED APPLICATION

The present application claims priority to U.S. Provisional Patent Application Ser. No. 63/338,893, filed on May 6, 2022, and entitled "DC Circuit Protection Device for Enhanced Selectivity", which is incorporated by reference herein in its entirety.

TECHNICAL FIELD

The present disclosure relates to direct current (DC) systems and, more particularly, some embodiments relate to DC protection circuits, devices, and methods that are well-suited for providing high selectivity.

BACKGROUND

Direct current (DC) electrical grids are gaining more prominence due to a number of advantages that a DC-operated electrical grid may have over an alternating current (AC)-operated electrical grid. For example, one well-recognized advantage of DC power distribution is that it provides for improved efficiency by eliminating certain power conversion steps required by an AC power distribution system that brings AC power to the load equipment, where it is converted to DC. In addition, DC electrical grids are particularly well-suited for integration with renewable energy sources, storage devices, and electrical vehicles.

Yet one challenge in widespread implementation of DC electrical grids relates to providing protection (e.g., overcurrent protection), and particularly to providing selective protection; namely, protection that is capable of isolating a fault (e.g., short-circuit condition) so as to disconnect only the portion of the grid where the fault arises, such that the remaining portions of the grid are not disconnected and continue to operate normally. Providing such selective protection may be even more challenging in meshed distribution topologies (e.g., where one or more of a plurality of DC sources supplying current to a bus may be disconnected, thereby possibly limiting current required for tripping downstream circuit breakers) as well as in DC electrical grids having bidirectional power flow, such as at various nodes (e.g., at a source) of a meshed network and/or at a node coupled to one or more devices (e.g., a battery or other energy storage device) that at times may be charged by, and at other times may supply power to, a DC bus of a DC grid network (which may or may not be a meshed network).

Accordingly, there remains a need for an improved DC protection devices (e.g., breakers) and associated methods, and particularly a need for improved DC protection devices capable of reliably detecting and clearing faults (e.g., overcurrent conditions) with selectivity, and which are also well-suited for various distribution topologies (e.g., mesh) and may be implemented for bi-directional power flow as well as for uni-directional power flow.

SUMMARY OF SOME ILLUSTRATIVE EMBODIMENTS

The present disclosure describes various illustrative embodiments of a solid-state DC protection device (also referred to herein as a solid state circuit breaker) that provides for rapidly detecting and clearing overcurrent faults, and discriminating and selectively clearing overload conditions, with high selectivity, and which may be implemented as a uni-directional protection device or a bi-directional protection device. Some embodiments provide a DC solid state protection device that comprises a capacitor configured such that in the event of a short-circuit condition, the capacitor provides all the short-circuit current required for the solid state protection device to detect a current indicative of a short-circuit condition and to cause a solid state switch to be opened, thereby tripping the solid state protection device.

Some embodiments of a solid state DC protection device comprise a first upstream terminal for coupling to a DC power source; a first downstream terminal; at least one solid state switching device each coupled in series between the first upstream terminal and first downstream terminal, each of the at least one solid state switching device having a first terminal, a second terminal, and a third terminal operable to selectively cause the solid state switching device to switch between (i) a closed state in which the first terminal is conductively coupled by a low impedance to the second terminal, and (ii) an open state comprising a high impedance between the first terminal and the second terminal; a control circuit configured (i) to sense a current conducted between the first upstream terminal and the first downstream terminal, and (ii) to selectively cause each of the at least one solid state switching device to switch between the closed state and the open state; a capacitor coupled to each of the at least one solid state switching device and configured to store sufficient charge such that, in the event of a short-circuit condition with respect to at least one of the first upstream and first downstream terminals, the capacitor supplies, via one of the at least one solid state switching device, all short-circuit current required for the control circuit to detect a current indicative of a short-circuit condition; and wherein the control circuit, in response to sensing that the current conducted via one of the at least one solid state switching device satisfies a threshold current level qualifying as a short-circuit condition, causes the at least one solid state switching device to switch between the closed state and the open state so as to generate an open circuit condition between the first upstream terminal and the first downstream terminal.

In various embodiments, the solid-state DC protection device may be configured as a unidirectional protection device or as a bidirectional protection device. Such a bidirectional protection device is capable of providing protection against a short circuit condition on any one of the first upstream terminal and the first downstream terminal.

In some embodiments, the control circuit is configured to be independently supplied with power from both the first upstream terminal and the first downstream terminal.

In some embodiments, the solid-state DC protection device may comprise at least one inductor coupled in series between the first upstream terminal and first downstream terminal and configured to control the rate of change of the short circuit current.

Some embodiments may further comprise pre-charge circuitry configured to pre-charge the capacitor prior to the solid state DC protection device being enabled. In various embodiments, the capacitor is configured from selective coupling of individual capacitors of a capacitor bank.

In some embodiments, the solid state DC protection device may comprise an electromechanical switch coupled in series between the first upstream terminal and first downstream terminal, wherein the control circuit is configured to cause the electromechanical switch to switch from a closed state to an open state at a time delay after the control circuit causes the at least one solid state switching device to switch between the closed state and the open state.

In some embodiments, the solid-state DC protection device may comprise at least one diode configured to conduct load current after the control circuit causes the at least one solid state switching device to switch between the closed state and the open state.

It will be appreciated by those skilled in the art that the foregoing brief description and the following description with respect to the drawings are illustrative and explanatory of some embodiments of the present invention, and are neither representative nor inclusive of all subject matter and embodiments within the scope of the present invention, nor intended to be restrictive or characterizing of the present invention or limiting of the advantages which can be achieved by embodiments of the present invention, nor intended to require that the present invention necessarily provides one or more of the advantages described herein with respect to some embodiments. Thus, the accompanying drawings, referred to herein and constituting a part hereof, illustrate some embodiments of the invention, and, together with the detailed description, serve to explain principles of some embodiments of the invention.

BRIEF DESCRIPTION OF THE DRAWINGS

Aspects, features, and advantages of some embodiments of the invention, both as to structure and operation, will be understood and will become more readily apparent in view of the following description of non-limiting and non-exclusive embodiments in conjunction with the accompanying drawings, in which like reference numerals designate the same or similar parts throughout the various figures, and wherein.

DETAILED DESCRIPTION OF SOME ILLUSTRATIVE EMBODIMENTS

Figure 1:
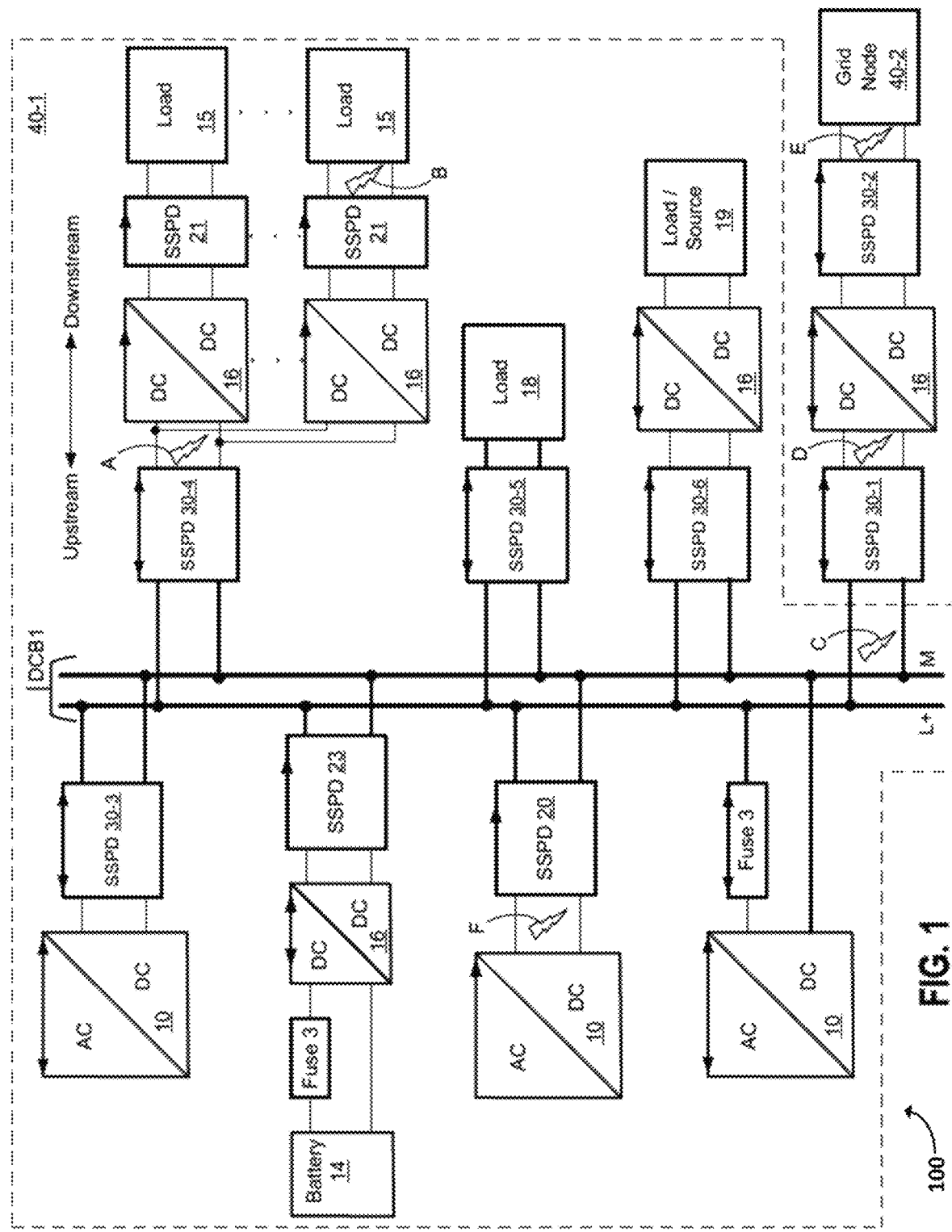
FIG. 1 schematically depicts a block diagram of an illustrative DC microgrid system employing uni-directional and bi-directional solid state protection devices (SSPDs) according to various embodiments of the present disclosure.

Throughout the description and claims, the following terms take at least the meanings explicitly associated herein, unless the context dictates otherwise. The meanings identified below do not necessarily limit the terms, but merely provide illustrative examples for the terms.

The phrase "an embodiment" as used herein does not necessarily refer to the same embodiment, though it may. In addition, the meaning of "a," "an," and "the" include plural references; thus, for example, "an embodiment" is not limited to a single embodiment but refers to one or more embodiments. Similarly, the phrase "one embodiment" does not necessarily refer to the same embodiment and is not limited to a single embodiment. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise.

In addition, as used herein, unless the context clearly dictates otherwise, the term "coupled" refers to directly connected or to indirectly connected through one or more intermediate components and, in some contexts, may also denote or include electrically coupled, such as conductively coupled, capacitively coupled, and/or inductively coupled. Further, "conductively coupled (connected)," "electrically coupled (connected)," and similar variants, each refer to being coupled (connected) via one or more intermediate components that permit energy transfer via conduction current, which is capable of including direct current as well as alternating current, while "capacitively coupled" refers to being electrostatically coupled through one or more dielectric media, and possibly also via one or more intervening conductors (e.g., via a series of capacitive components), that permit energy transfer via displacement current and not via direct current between the coupled (connected) components. Those skilled in the art will further understand that elements may be capacitively coupled intentionally or unintentionally (e.g., parasitically) and that in some contexts, elements said to be capacitively coupled may refer to intentional capacitive coupling. In addition, those skilled in the art will also understand that in some contexts the term "coupled" may refer to operative coupling, through direct and/or indirect connection. For instance, a conductor (e.g., control line) said to be coupled to the gate of a field effect transistor (FET) may refer to the conductor being operable to control the gate potential so as to control the operation of the FET (e.g., switching the FET between "on" and "off" states), regardless of whether the conductor is connected to the gate indirectly (e.g., via another transistor, etc.) and/or directly.

Further, as used herein, the term "overcurrent" may refer to a current that exceeds a nominal acceptable continuous operating current for a given circuit, and may thus refer to a short-circuit condition or an overload condition, unless the context clearly dictates otherwise. In this regard, a "short-circuit" may refer to an overcurrent that exceeds a predetermined threshold current such that a protection device is triggered to open (e.g., "tripped") instantaneously (e.g., as fast as possible, without intentional delay) or possibly nearly-instantaneously (e.g., nearly as fast as possible, with short intentional delay such as to facilitate selectivity relative to a downstream protection device). In contrast, an "overload" may refer to an overcurrent that does not exceed the predetermined threshold short-circuit current, such that the overload current may be tolerated (e.g., permitted to conduct through the circuit, before tripping a protection device) for a time period that may, for example, be controlled based on device and/or equipment overheating and/or degradation. Also, as used herein, the term "fault" may refer, for example, to a short-circuit (e.g., line-to-line, line-to-ground) or an arc fault, unless the context clearly dictates otherwise. It will be understood, however, that while short-circuit protection may be controlled based on a current threshold, in some implementations it may alternatively or additionally be controlled based on one or more other characteristics, such as rate of change of current (di/dt) and/or bus voltage drop reaching a threshold.

For clarity, while the terms medium-voltage and low-voltage may have different definitions in various standards, or otherwise may be understood as having different meanings in various contexts, as used herein, medium-voltage may refer to an alternating current (AC) root mean square (rms) voltage in the range of about 1 KV to about 52 KV or to a direct current (DC) voltage in the range of about 1.5 KV to about 75 KV; and low-voltage may refer to an alternating current (AC) rms voltage less than about 1 KV or to a direct current (DC) voltage less than about 1.5 KV. As may be understood by the ensuing disclosure, however, embodiments in accordance with the present disclosure are not limited to a particular voltage or voltage range.

FIG. 1 schematically depicts a block diagram of an illustrative DC microgrid system 100 for purposes of clarity of exposition in further describing various illustrative embodiments of uni-directional and bi-directional solid state protection devices (SPPDs) according to the present disclosure, and in understanding the significance of such SPPDs providing selectivity (i.e., isolating a fault (e.g., short-circuit condition) so as to disconnect only the portion of the grid where the fault arises, such that the remaining portions of the grid are not disconnected and continue to operate normally) under conditions where conventional protection devices, including so-called fast solid state protection devices, may fail to provide selectivity.

For instance, as understood by those skilled in the art, because the input impedance of a DC distribution network (e.g., comprising microgrid systems) bus generally has a low inductance, current may rapidly increase to destructive levels under short-circuit conditions. A protection method to address this problem employs fast-switching protection devices (e.g., using solid state (e.g., semiconductor) switching devices) so as to sufficiently limit the time of the short-circuit event, thereby limiting the maximum magnitude of the short-circuit current to well below damaging levels (e.g., limiting the maximum short-circuit current to about twice, or possibly several times, the nominal current). But ensuring fast switching sufficient to prevent excessive (e.g., destructive) short-circuit currents (e.g., such as switching in about a microsecond, or within 10 microseconds) may restrict the extent to which the switching times (and, correspondingly, current thresholds) of different protection devices in the network may be coordinated (e.g., shifting of programmed time-current trip curves) so as to facilitate selectivity. Thus, under various short circuit and/or network topology conditions, a downstream short-circuit event protected by a downstream conventional fast-switching (e.g., solid state) protection device may cause undesired tripping of an upstream protection device due to practical restrictions on coordinated tripping.

Another, often related, problem with known DC protection devices that may, for example, be coupled to the output of a DC-to-DC converter, is that a short-circuit condition downstream from the protection device may cause rapid discharging of an output capacitance of the DC-to-DC converter. As such, the fault (short-circuit) condition may propagate upstream of the DC-to-DC converter, as the DC-to-DC converter attempts to restore its output voltage level and to supply the short-circuit current. And under some circumstances, the DC-to-DC converter output power may be inadequate for supplying a sufficient level of short-circuit current through the downstream protection device to cause tripping of the downstream protection device. As will be understood by the ensuing disclosure, SSPDs in accordance with the present disclosure may overcome such problems and limitations associated with conventional SSPDs.

As shown in FIG. 1, illustrative DC microgrid system 100 comprises a microgrid node 40-1 and a similar (but not necessarily identical) microgrid node 40-2 coupled by two bi-directional SSPDs (SSPD 30-1 and SSPD 30-2) and an intervening bi-directional DC/DC converter 16. It may be understood, for example, that bi-directional SSPDs 30-1 and 30-2 alternatively may be implemented as uni-directional SSPDs. It also will be understood, for example, that in some alternative embodiments wherein microgrid node 40-2 may comprise a main DC bus operating at the same voltage level as the main DC bus (DCB1) of microgrid node 40-1, microgrid node 40-2 may be coupled to microgrid node 40-1 by only a bi-directional SSPD (i.e., eliminating one of the SSPDs 30-1 and 30-2 and eliminating the DC/DC converter 16 shown therebetween in the embodiment of FIG. 1). It may also be understood that various alternative embodiments of DC microgrid system 100 may comprise, for example, only microgrid node 40-1, or additional coupled microgrid nodes. In FIG. 1, a component (e.g., a converter or an SSPD) configured for bi-directional power flow includes a bi-directional arrow, whereas a component configured for uni-directional power flow includes a uni-directional arrow (indicating the power flow direction).

Illustrative microgrid node 40-1 comprises various sources configured to supply DC power to a main DC bus DCB1, which is configured to distribute DC power to various loads 15 and 18, and to a load/source device 19. As depicted, one of the sources supplying power to bus DCB1 is an alternating current (AC) power source (not shown; e.g., utility feeder, etc.) coupled to DCB1 via a bidirectional AC/DC converter 10 and a bi-directional SSPD 30-3. As such, power may flow from this AC source to bus DCB1 ("downstream), or from bus DCB1 to the AC source ("upstream"). Another AC power source (not shown; e.g., utility feeder, backup generator, etc.) supplies power to DCB1 via a uni-directional AC/DC converter 10 and a unidirectional SSPD 20. And a third AC power source (not shown; e.g., utility feeder, backup generator, etc.) supplies power to DCB1 via a bi-directional AC/DC converter 10 and a fuse 3. A DC power source, namely, battery 14, also is configured to selectively supply power to (e.g., backup power) DCB1 via a fuse 3, a DC/DC converter 16, and a uni-directional SSPD 23. SSPD 23 is essentially identical to SSPD 20, except that in normal operation of the node 40-1, SSPD 23 is in an open state and may be switched to a closed state in the event that insufficient power to satisfy the load requirements is provided via AC/DC converters 10, whereas SSPD 20 is normally in the closed state so as to supply power from the upstream (source) side to the downstream (load) side. It will be understood that, depending on the implementation, various alternative and/or additional sources and/or alternative source configurations may be implemented, with power sources comprising any of various renewable and/or non-renewable energy sources.

Power from bus DCB1 may be distributed to various loads, such as illustratively depicted loads 15, load 18, and load/source 19. More specifically, in this illustrative embodiment, power from bus DCB1 is distributed to a plurality of loads 15 via respective DC/DC converters 16, each outputting power via a respective integral unidirectional SSPD 21 and having a common bus input coupled to the downstream (load-side) port of bidirectional SSPD 30-4, which has its upstream (source-side) port coupled directly to bus DCB1.

SSPDs 21 may be implemented essentially identically to SSPDs 20; for example, all uni-directional SSPDs may have the same configuration of electrical components and electronics, though the current rating (e.g., corresponding to the short-circuit threshold current) of different SSPDs may differ according to the nominal source and/or load current characteristics of the respective source and/or load to which the respective SSPDs are connected.

Load 18 is shown, by way of example, as being coupled to bus DCB1 via a bidirectional SSPD 30-5, without an intervening converter. It may be understood that, in some embodiments, load 18 may include a fuse such that SSPD 30-5 may be alternatively implemented as a uni-directional SSPD (e.g., such that load 18 would be protected by the fuse in the event of an upstream short-circuit condition, such as a short-circuit on bus DCB1. It also may be understood that in some embodiments, for example, load 18 may also be coupled to an alternative source (not shown; e.g., a battery, such as photo-voltaic-charged battery, etc.) such that load 18 may be selectively supplied by either the alternative source or the power supplied via bus DCB1.

As also shown, load/source 19 is coupled to DCB1 via a bi-directional SSPD 30-6 and a bi-directional DC/DC converter 16. By way of non-limiting example, load/source 19 may comprise a rechargeable battery (e.g., in an electric vehicle, or a premises-based photo-voltaic-charged battery, etc.) that may selectively receive power from DCB1 (for charging load/source 19, as the sole mechanism for charging load/source 19, or as an alternative to another means (e.g., photo-voltaic, etc.) for selectively charging load/source 19).

It will be understood that in various implementations, loads 15, load 18, and/or load/source 19 may comprise any of myriad types of critical and/or non-critical loads and/or loads/sources (e.g., homes, home appliances, factories, data centers, electric vehicles, etc.).

AC/DC converters 10 may be implemented as, for example, any known diode and controlled rectifier, active front end (AFE), or other circuit topology for converting AC voltage to DC. For instance, as known to those skilled in the art, an AFE provides for bidirectional power flow and generally comprises a front-side input filter (e.g., an L, LC, or LCL type) to remove high frequency current components and control the switching frequency ripple, followed by a configuration of active power switches (e.g., six switches for a two-level AFE) such as IGBTs (insulated gate bipolar transistors) or MOSFETs (metal-oxide-semiconductor field effect transistors) that are controlled based on a suitable pulse width modulation (PWM). By way of non-limiting example, in this illustrative embodiment, AC/DC converters 10 may be implemented as AFEs that convert a three-phase AC input to a nominal 350 V DC output.

As shown, for each AC/DC converter 10, the DC power output from the AC/DC converter 10 is coupled in parallel to bus DCB1. More specifically, in normal operation, SSPDs 20 and 30-3 coupled to AC/DC converters 10 are in a closed state such that the DC power (e.g., supplied at 350 V) output by their corresponding respective AC/DC converters 10 is supplied in parallel, together with the DC power supplied by AC/DC converter 10 coupled to fuse 3, to loads 15, load 18, and load/source 19 via bus DCB1. This paralleling of the AC/DC converters 10 (also referred to herein as the DC sources) may be controlled, for example, according to droop compensation so as to provide for a nominal DC output voltage range on bus DCB1 (e.g., 350 V plus or minus about 30 V) with current sharing among the DC sources.

In some alternative embodiments, more than one SSPD may be coupled in parallel to a common rectifying output of a given AC/DC converter 10 (e.g., a common rectifier output of an AFE). In various alternative embodiments, AC/DC converter 10 (e.g., AFE) may comprise parallel-connected rectifiers having respective outputs that are coupled to respective SSPDs.

Each unidirectional SSPD 20, 21 (and 23) when in a closed state (i.e., having its switch in a state such that power from the upstream side is supplied to the downstream side), rapidly detects a short-circuit condition (e.g., based on the current reaching a threshold level, such as twice the nominal load current) on the downstream side, and in response thereto rapidly switches (e.g., immediately, or nearly-immediately) to an open state. Likewise, each bidirectional SSPD 30 when in a closed state (i.e., having its switch in a state such that power is supplied either from the upstream side to the downstream side or from the downstream side to the upstream side), rapidly detects a short-circuit condition (e.g., based on the current reaching a threshold level, such as twice the nominal current) on the downstream side or the upstream side, and in response thereto rapidly switches (e.g., immediately, or nearly-immediately) to an open state. It will be understood that even with respect to bi-directional power flow components, the terms "upstream" and "downstream" are arbitrarily used herein to reference the same topological directions as used in connection with unidirectional power flow components (as depicted in FIG. 1), rather than being reversed when power flows in a direction opposite to that in which it flows in unidirectional power flow components.

By way of non-limiting example, each SSPD 20, 21, 30-$x$ ($x$=1-6; each SSPD 30-$x$ referred to hereinafter individually and/or collectively as SSPD 30), and 23 may detect and clear a short circuit condition within tens of microseconds, and more preferably in less than ten microseconds (e.g., several microseconds, or about one microsecond, or about 500 nanoseconds) of such fault event initiating. Likewise, by way of non-limiting example, each SSPD 20, 21, 30, and 23 may detect an overload condition in less than ten microseconds (e.g., several microseconds or less) of such overload condition initiating, and may switch to an open state at a time after such detection that may be a function of the overload current magnitude, so as to provide protection against damage and/or failure that may be caused by overheating (e.g., damage to and/or degradation of a solid state (e.g., semiconductor) switching device included in the SSPD).

As discussed, SSPDs 20, 21, 23, and 30 in accordance with embodiments of the present disclosure are configured to provide fast switching (e.g., to preclude destructive current levels) together with selectivity, i.e., locally isolating faults. Thus, for example, a fault A (e.g., a short circuit between the downstream output conductors of SSPD 20) will cause the immediately upstream SSPD 30-4 to trip, isolating all downstream DC/DC converters 16 and corresponding loads 15, and the short-circuit will not be visible upstream and, particularly, will not cause tripping of any of the SSPDs 20 and 30-$y$ ($y$=1, 3, 5, 6) that are coupled directly to bus DCB1. Similarly, a short-circuit B will cause only the immediately upstream SSPD 21 to trip, isolating only the load 15 coupled directly thereto. A fault C on the main bus DCB1 (e.g., line L+ to return conductor M short circuit) causes tripping of all SSPDs 20 and 30-$y$ ($y$=1, 3-6) that are directly coupled to bus DCB1 (as well as tripping fuse 3 that is connected to AC/DC converter 10), thus effectively disabling node 40-1; however, microgrid node 40-2 remains fully operational. And a fault D is isolated by both the immediately upstream SSPD 30-1 and the immediately downstream SSPD 30-2; accordingly, both the main bus DCB1 (and hence the entirety of node 40-1) and microgrid node 40-2 are unaffected and remain fully operational. A fault E with respect to node 40-2 is analogous to fault C with respect to node 40-1; more specifically, while a fault E (e.g., short circuit) will effectively disable microgrid node 40-2, microgrid node 40-1 remains fully operational.

Likewise, a fault F is equivalent to a fault C. More specifically, SSPD 20 is implemented, in this illustrative embodiment, as a uni-directional SSPD oriented to protect AC/DC converter 10 from faults on the main bus DCB1. As such, SSPD 20 will not provide rapid protection against a fault F (even though a fuse that may be provided in SSPD may blow in response to fault F), and thus fault F will propagate to bus DCB1, causing tripping of all SSPDs 30-$y$ ($y=1$, 3-6) that are directly coupled to bus DCB1 (as well as tripping fuse 3 that is connected to AC/DC converter 10), thus effectively disabling node 40-1; however, microgrid node 40-2 remains fully operational. In various alternative embodiments, a bidirectional SSPD may be substituted for unidirectional SSPD 20 (and, in some embodiments, also for unidirectional SSPD 23), so as to provide rapid, high selectivity protection against fault F, so as to isolate fault F on the upstream side of the SSPD; i.e., preventing fault F from propagating to bus DCB1, thus permitting microgrid node 40-1 to remain operational despite the occurrence of fault F. In view of the present disclosure, those skilled in the art will understand that whether a given SSPD is implemented as a unidirectional SSPD or a bidirectional SSPD may be a design choice that may depend on factors such as the probability of an upstream fault occurring, the impact or effective cost associated with the upstream fault occurring, and the additional energy/power losses and monetary costs of a bidirectional SSPD relative to a unidirectional SSPD.

Figure 2A:
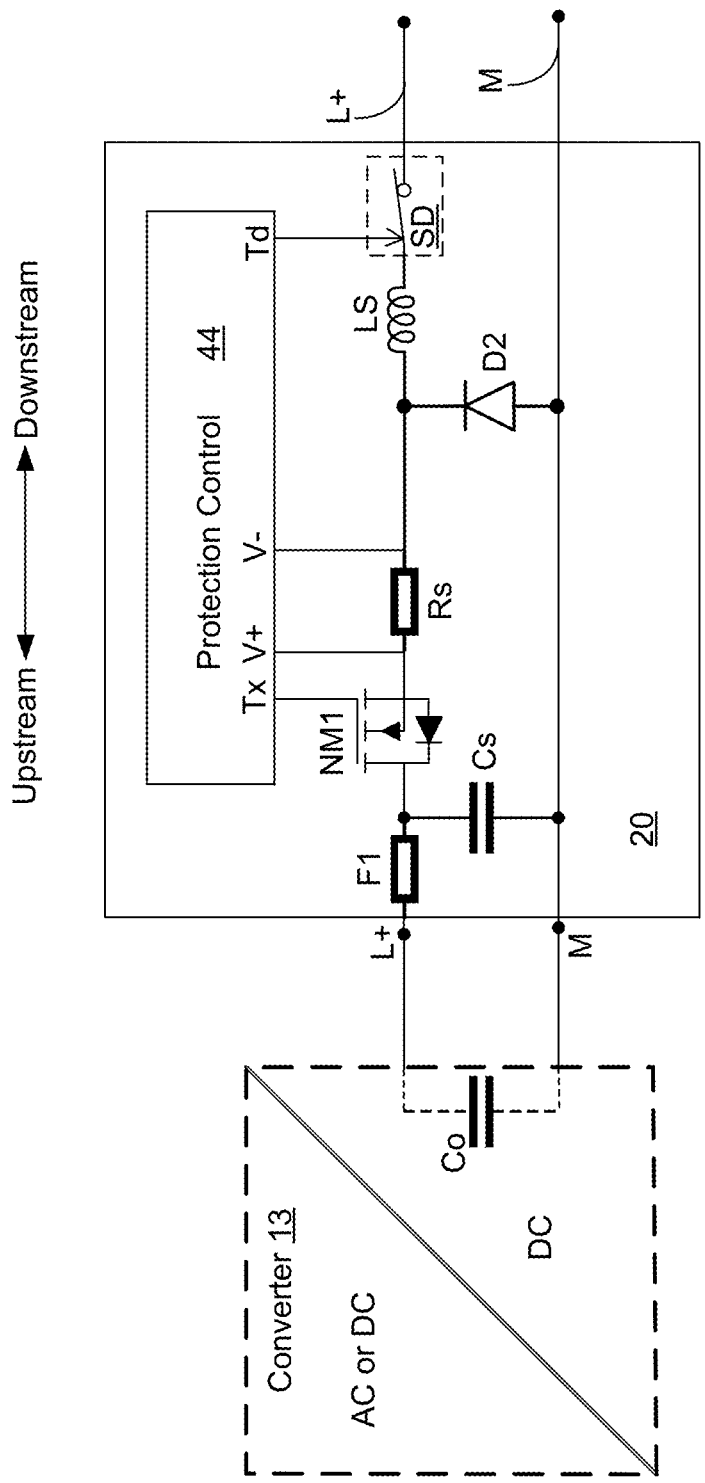
FIGS. 2A and 2B each schematically depicts an illustrative unidirectional SSPD, in accordance with some embodiments of the present disclosure.

FIG. 2A schematically depicts an illustrative embodiment of a unidirectional SSPD 20, in accordance with some embodiments. As shown, illustrative SSPD 20 includes a fuse F1, a capacitor Cs, a semiconductor transistor NM1 (shown as a MOSFET or insulating gate FET), a sense impedance Rs (e.g., resistor), a diode D2, an inductor LS, a switching device SD, and a protection control circuit 44, and is configured to selectively couple DC power (such as DC power output by a converter 13 (e.g., an AC/DC converter 10 or a DC/DC converter 16)) from its upstream port comprising upstream positive line L+ terminal and upstream negative line M terminal (e.g., return line or mid-line) to its downstream port comprising downstream positive line L+ terminal and downstream negative line M terminal. As shown, upstream negative line terminal M and downstream negative line terminal M comprise a common conductive terminal. As such, while in some embodiments upstream and downstream M terminals may be implemented as separate terminals conductively connected internally, some alternative embodiments of SSPD 20 may implement the depicted upstream and downstream M terminals as a single M terminal. It may be understood that in various alternative embodiments, transistor NM1 may be implemented as an alternative solid state switching device, such as an IGBT (insulated gate bipolar transistor) or other applicable semiconductor controllable-switching device, that provides for high-speed switching (e.g., compared to, for example, an electromechanical relay or other electromechanical switching device); for example, preferably capable of switching in less than 10 microseconds, such as several microseconds, or a microsecond, or 500 nsec, or less than 500 nsec.

As shown, in this illustrative embodiment, a fuse F1 may be incorporated into SSPD 20 (e.g., provided as a so-called end-of-life (EOL) fuse) to provide protection against an upstream fault (e.g., a source fault, such as a short-circuit in converter 13), as well as to provide additional protection against a downstream fault (e.g., in the event that transistor NM1 and switch SD fail to open in response to a downstream overcurrent condition). As will be further understood in view of the ensuing description of SSPD 20, fuse F1 may be selected such that it will not trip before transistor NM1 trips and switch SD opens under an overcurrent (e.g., short circuit or overload) condition occurring downstream of SSPD 20. It will be understood that in some implementations such a fuse F1 may be alternatively or additionally incorporated in converter 13, whereas in some embodiments such a fuse F1 may be alternatively or additionally incorporated between the L+ output of an upstream DC source (e.g., converter 13) and the upstream (e.g., source-side) L+ terminal of SSPD 20 (e.g., regardless of whether a fuse may be included in the source (e.g., in converter 13) and/or in SSPD 20 (e.g., F1, as shown)).

Diode D2 is coupled across the output port of SSPD 20 and configured to act as a free-wheeling diode to, e.g., carry inductive current that may continue flowing (e.g., associated with the inductance LS and/or the inductance of the bus) in the event that transistor NM1 is switched open.

In some embodiments, switching device SD may be included to provide for additional isolation between converter 13 and downstream (e.g., load-side) bus conductors L+ and M in the event that transistor NM1 is switched to the open state in response to a fault or overload condition. More specifically, switching device SD is normally closed and may be switched to the open state after transistor NM1 has been opened and the free-wheeling current through diode D2 has decreased (or had an opportunity to decrease) below a nominal level (e.g., decreased to or below a negligible magnitude). For instance, in various alternative embodiments, the time at which switching device SD is opened after NM1 has been opened may be determined based on measuring the free-wheeling current (e.g., using an additional sense resistor, or, alternatively, configuring SSPD 20 with sensor resistor Rs positioned in series with LS and between D2 and LS) and/or by measuring the change in the free-wheeling current (e.g., by measuring the voltage across inductor LS) and/or based on a minimum time delay after NM1 has been opened.

Switching device SD may be implemented as, for example, an electromechanical switch (e.g., electromechanical relay). In some embodiments, the intrinsic delay between switching device SD being triggered to open and switching device SD achieving an open state (e.g., the response time, or switching time, of the electromechanical relay) may be of sufficient duration relative to the switching time of NM1 such that a common signal within protection control circuit 44 may be coupled to outputs Tx and Td to essentially simultaneously trigger the turning off of NM1 and SD (e.g., upon detection of a short-circuit), and SD will achieve an open state a sufficient time after NM1 achieves an open state based on the difference between their respective switching times.

While under normal operation of SSPD 20, SD will open at some appropriate time after NM1 opens in response to an overcurrent event, it will be understood that the opening of SD is not contingent on the opening of NM1. For example, in the event that NM1 fails to open in response to an overcurrent event (e.g., due to NM1 being defective and/or certain protection control circuitry, such as the Tx driver circuitry, being defective), SD will still open (e.g., assuming no defect or damage to SD or, e.g., Td driver circuitry), thereby interrupting the current. In the event that both NM1 and SD fail to open in response to an overcurrent event, fuse F1 will blow and thereby interrupt the current flow between the upstream input port and downstream output port of SSPD 20. It will be understood, therefore, that in various embodiments, the switching time of SD should be slower than that of NM1 but greater than the speed at which fuse F1 blows at currents at or on the order of the short-circuit current threshold.

Protection circuit 44 may comprise, for example, a microcontroller or other programmable processor (or other digital circuitry), and may include analog circuitry (e.g., as a mixed-signal microcontroller or mixed-signal ASIC; and/or as analog circuitry components that are not monolithically integrated with a microcontroller or other programmable processor, etc.). In some embodiments, protection circuitry 44 may also be communicably coupled to a host device (not shown) via a bus (e.g., using the Modbus protocol over RS485 and/or using power-line communication (PLC)). In various embodiments, protection control circuit 44 may detect a fault and/or an overload condition according to an analog-only signal chain and/or a mixed-signal signal chain.

In some embodiments, protection control circuit 44 may detect a short-circuit or overload condition according to the sensed voltage across resistor Rs (and thus the corresponding current through resistor Rs) exceeding one or more threshold levels (e.g., a first threshold corresponding to an overload overcurrent condition; a second threshold corresponding to a short-circuit overcurrent condition). For instance, in some embodiments, short circuit protection may be based on an analog comparator circuit responsive to the voltage sensed across the V+ and V– inputs. In some such embodiments, the output of the comparator may be coupled—without conversion to a digitally-processed signal—to cause the gate input of transistor NM1 to be pulled down (turning NM1 off), either without any intentional added delay or, in some embodiments, with an adjustable intentional delay provided by intervening circuitry. Alternatively or additionally, in some embodiments, the comparator output may be sensed (e.g., sampled binary signal) by a program-controlled digital processor that selectively controls the gate input of transistor NM1. And, in some embodiments, for example, the voltage sensed across the V+ and V– inputs may be converted (by an analog-to-digital converter) to a sampled digital signal that is processed by a program-controlled digital processor to selectively control the gating of transistor NM1, including, for example, controlling or determining any intentional delay in causing the gate of transistor NM1 to be pulled down.

It may also be understood in view of the foregoing that, in some embodiments, short-circuit protection may be implemented based on an analog signal chain (e.g., comprising a comparator circuit)—without use or involvement of a program-controlled digital processor—whereas overload protection may be based on digital processing (e.g., using a program-controlled digital processor) of voltage(s) sensed (e.g., sampled) across the V+ and V– inputs so as to determine when transistor NM1 should be turned off based on the magnitude and duration of the overload current samples (e.g., in view of component/device overheating).

In some embodiments, protection control circuit 44 may alternatively or additionally detect a fault or overload condition by sensing (e.g., monitoring) at sense inputs V+ and V– the voltage across impedance (e.g., resistor) Rs for transients or rapid changes (e.g., change exceeding some threshold). Such transient or rapid-change detection may be implemented in various ways, such as by digitally calculating changes in the voltage and/or by other digital filtering and/or transform techniques, corresponding to identifying high rates of change in the time domain (e.g., di/dt) and/or high frequency components in the frequency domain (e.g., based on FFT, DCT, or other transform components). Alternatively or additionally, in some embodiments, such transient or rapid-change detection may be based on (e.g., at least in part) analog circuitry, such as an analog comparator that compares the magnitude of the difference between successively sampled voltages sensed across the V+ and V– inputs (i.e., across resistor RS) with a threshold/reference voltage level. In some embodiments, impedance Rs (and/or another impedance) may be implemented as an inductance such that the measured voltage corresponds directly to di/dt.

In accordance with the foregoing description, based on the signal monitored (e.g., sensed or sampled) at sense inputs V+ and V–, protection control circuit 44 selectively controls (i) the state of transistor NM1 via output Tx which is coupled to the gate of transistor NM1, and (ii) the state of switching device SD via output Td. For instance, as described, upon detecting a short-circuit condition (e.g., based on an analog comparator determining that the current satisfies a threshold, such as reaching and/or exceeding twice the nominal/maximum safe operating current), protection control circuit 44 rapidly turns off transistor NM1 and then turns off switching device SD after a minimum time delay (which may be a function of the measured short-circuit current magnitude) and/or after a measurement indicating that the free-wheeling current has decreased below a threshold level. In some embodiments, as discussed above, a common signal within protection control circuit 44 may be coupled to outputs Tx and Td to essentially simultaneously trigger the turning off of NM1 and SD (e.g., upon detection of a short-circuit), and SD will achieve an open state a sufficient time after NM1 achieves an open state based on the difference between their respective switching times.

Also, for example, upon detecting an overload condition, protection control circuit 44 may turn off transistor NM1 after a time delay that may be a function of the magnitude of the overload current, so as to prevent overheating of, for example, transistor NM1 that may cause degradation or failure thereof. More specifically, in various embodiments, at least one sample—and, e.g., possibly multiple, periodic samples—of an overload current may be digitally sampled by protection control circuit 44, and the time at which transistor NM1 will be turned off may be based on the magnitude(s) of the overload current sample(s) in view of pre-characterization of the power and/or energy dependent (e.g., current magnitude and/or duration dependent) heating and degradation properties of transistors corresponding to transistor NM1. In some embodiments, protection circuit 44 may incorporate a look-up table that is based on such pre-characterization and which may be referenced based on the sensed overload current sample(s) to determine the time at which transistor NM1 will be opened under an overload current condition. Under such an overload condition, protection control circuit 44 also causes switch SD to open after transistor NM1 opens, in a manner corresponding to any of the implementations described hereinabove for a short-circuit condition.

As further described below, capacitor Cs is configured (e.g., has sufficient stored charge) such that in the event of a short-circuit condition on the downstream side of SSPD 20, capacitor Cs provides the short-circuit current required for SSPD 20 to be tripped (i.e., for protection device 44 to detect a current indicative of a short-circuit condition and to thereby cause solid state switch NM1 to switch to an open state). Because Cs provides all the required current through opening of switch NM1, all current remains local during the short-circuit event and the upstream sources in the system are thus not affected, thereby providing for selectivity.

Inductor LS is configured to ensure a gradual current increase in the event that a short circuit condition arises. For instance, inductor LS may have an inductance sufficient so that in the time required or otherwise elapsed for (i) protection control circuit 44 to detect a short-circuit condition (e.g., upon the current reaching a threshold level, such as twice the nominal maximum current level under normal operating conditions (i.e., no overload/overcurrent)), (ii) protection control circuit 44 to then drive the gate of NM1 to a voltage level for turning off NM1, and (iii) transistor NM1 to thereby turn off (i.e., switch its channel to an open (high impedance) state between its drain and source terminals), the current magnitude capable of being reached by the short-circuit current is limited to a predetermined level (e.g., to preclude damage/destruction).

In addition, as will be further understood below (e.g., in relation to the description of FIG. 4), the inductance of inductor LS may also be selected, together with the capacitance of capacitor Cs, to ensure that capacitor Cs is capable of supplying the short-circuit current over the above-described elapsed time as well as, in some embodiments, over the time period that the current increases from its nominal operating level to the short-circuit threshold level (e.g., twice the nominal maximum current level under normal operating conditions). By way of non-limiting example, it may be estimated that during the short-circuit event, the current will increase approximately linearly from its nominal current level at an approximate rate of the voltage at the input (upstream) port (e.g., the nominal voltage output by converter 13) divided by the inductance LS, thus requiring Cs to supply a total charge corresponding to the integral of the linearly increasing current over this time interval. As such, increasing the inductance LS decreases the rate at which the current increases, thereby requiring a larger capacitance Cs for supplying the current over the time period that the current increases from its nominal operating level to the short-circuit threshold level together with the above-described elapsed time from when the short-circuit current is detected until transistor NM1 achieves the open state (i.e., corresponding to peak short-circuit current). It will be understood that the system inductance (e.g., the inductance of the downstream bus) should also be accounted for in selecting an appropriate inductance LS, and that in various implementations such system inductance may be sufficient such that inductor LS may be optional and, therefore, may not be included in various embodiments of SSPD 20.

As shown, capacitor Cs is coupled across the input port of SSPD 20, which is coupled to the output port of converter 13 (e.g., via fuse F1), which has an associated output capacitor Co. As described above, in some implementations, output capacitor Co may have a relatively small capacitance that—when, for example, converter 13 is used with a known protection device (e.g., such as known fast (e.g., solid stated) DC breakers) coupled to its output—may be rapidly discharged by a short-circuit current associated with a downstream short circuit event. Such rapid discharge of Co effectively propagates the short circuit event upstream of converter 13 and, under some configurations, converter 13 may be unable to supply the threshold short circuit current level required for the known protection device to detect a short circuit condition and trip.

In accordance with some embodiments according to the present disclosure, however, capacitor Cs of SSPD 20 has sufficient capacitance (and associated stored charge at the nominal output voltage of converter 13) so that capacitor Cs is capable of providing the short-circuit current required to trip the protection device SSPD 20 such that SSPD 20 is switched to the open (transistor NM1 "off") state in the event that a downstream short-circuit event occurs. In other words, in some embodiments, capacitor Cs has sufficient capacity to provide the short circuit current not only until the short circuit current reaches a threshold level required for protection control circuit 44 to detect the short circuit event, but also as the short circuit current continues to increase to its peak value during the time period required for transistor NM1 to achieve an open state after its gate has been driven to an off voltage level by protection control circuit 44 in response to protection control circuit 44 detecting the short circuit event. As such, the converter 13 is not affected by (e.g., output capacitance Co is not rapidly discharged by) the short-circuit current, and as such, the short-circuit condition is prevented from propagating upstream of SSPD 20, thereby isolating and localizing the fault condition downstream from SSPD 20, without requiring any coordinated short-circuit trip current and/or short-circuit trip time with respect to any upstream protection devices (though such coordination (e.g., upstream short-circuit protection progressively being somewhat slower; i.e., increased trip time or current threshold) may be employed to further support overall system selectivity).

In accordance with some embodiments, capacitor Cs is preferably controllably pre-charged upon system power up, before SSPD 20 becomes active as a protection device (e.g., before protection control circuit 44 is enabled to provide short-circuit protection control). Such pre-charging advantageously prevents so-called inrush current and current transients (e.g., "spikes"), which may cause circuit damage and/or may cause unintended, spurious tripping of upstream protection devices (e.g., such as sensitive fast protection devices). In some embodiments, such as the illustrative embodiment of FIG. 2A, such pre-charging of Cs may be implemented under control of converter 13 pre-charging its output capacitance.

Figure 2B:
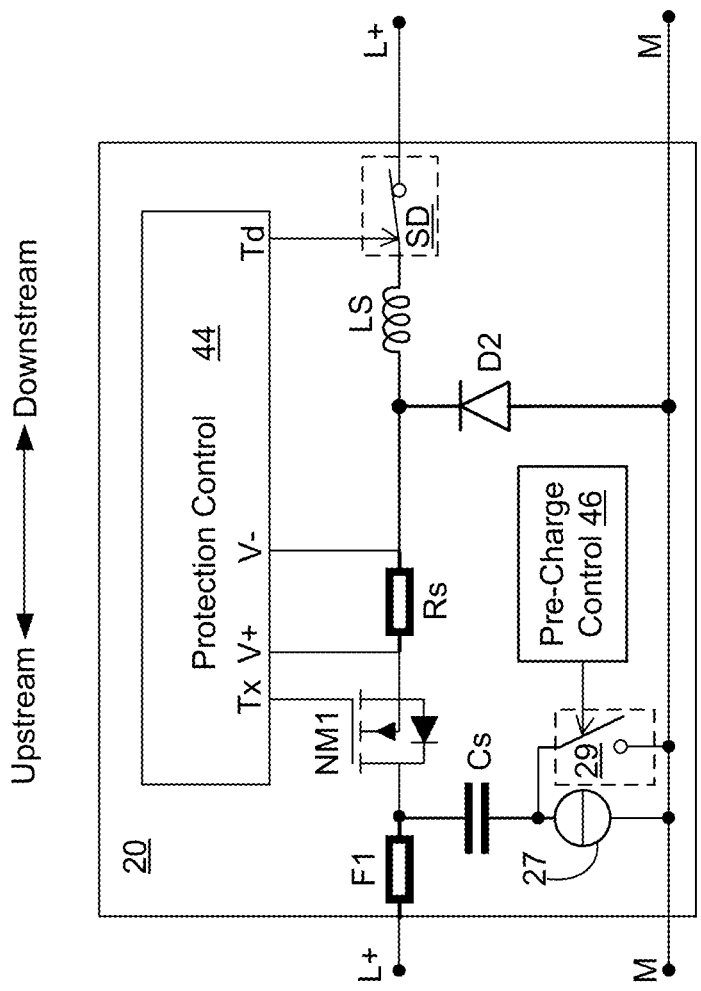

FIG. 2B illustrates an alternative illustrative embodiment of a SSPD 20, in accordance with some embodiments. As shown, the illustrative SSPD 20 embodiments of FIG. 2A and FIG. 2B are essentially identical, except for SSPD 20 of FIG. 2B including circuitry for pre-charging capacitor Cs; namely, current sink circuitry 27, shunt switch 29, and pre-charge control circuitry 46. It may be understood that pre-charge control circuitry 46, and possibly also shunt switch 29 and/or current sink circuitry 27, may be integrated as part of protection control circuit 44. In operation, upon power-up of SSPD 20 (e.g., following installation), prior to SSPD 20 being enabled for protection, shunt switch 29 is in the open state and capacitor Cs is charged through current sink circuitry 27 to the nominal DC bus voltage between L+ and M terminals. Upon capacitor Cs being charged to the nominal DC bus voltage, precharge-control circuit 46 causes shunt switch 29 to close, and protection control circuit 44 is enabled to control NM1 (and SD) in response to the signal sensed across impedance Rs at inputs V+ and V−.

FIGS. 3A-3E schematically depict various illustrative implementations of a bidirectional SSPD 30, in accordance with some embodiments. As may be appreciated in view of the foregoing disclosure of illustrative embodiments of a unidirectional SSPD 20, bidirectional SSPD 30 essentially comprises a pair of opposing unidirectional SSPDs, with transistor NM2, free-wheeling diode D2, inductor LS2, and sense impedance (e.g., resistor) Rs2 providing for protection (under control of protection control circuit 44 via output Txa and inputs V2+ and V2−) against upstream overcurrent conditions and functionally corresponding to transistor NM1, free-wheeling diode D1, inductor LS1, and sense impedance (e.g., resistor) Rs1, respectively, which provide for protection against downstream overcurrent conditions (under control of protection control circuit 44 via output Txb and inputs V1+ and V1−). As may be appreciated, and as noted above, the terms "upstream" and "downstream," as referenced in FIGS. 3A-3E are arbitrarily designated for ease of reference, at least insofar as SSPD is configured for bidirectional power flow corresponding to bidirectional sources, wherein at a given time during operation a power source may be at any one of the designated "upstream" and "downstream" sides of SSPD 30.

Figure 3A:
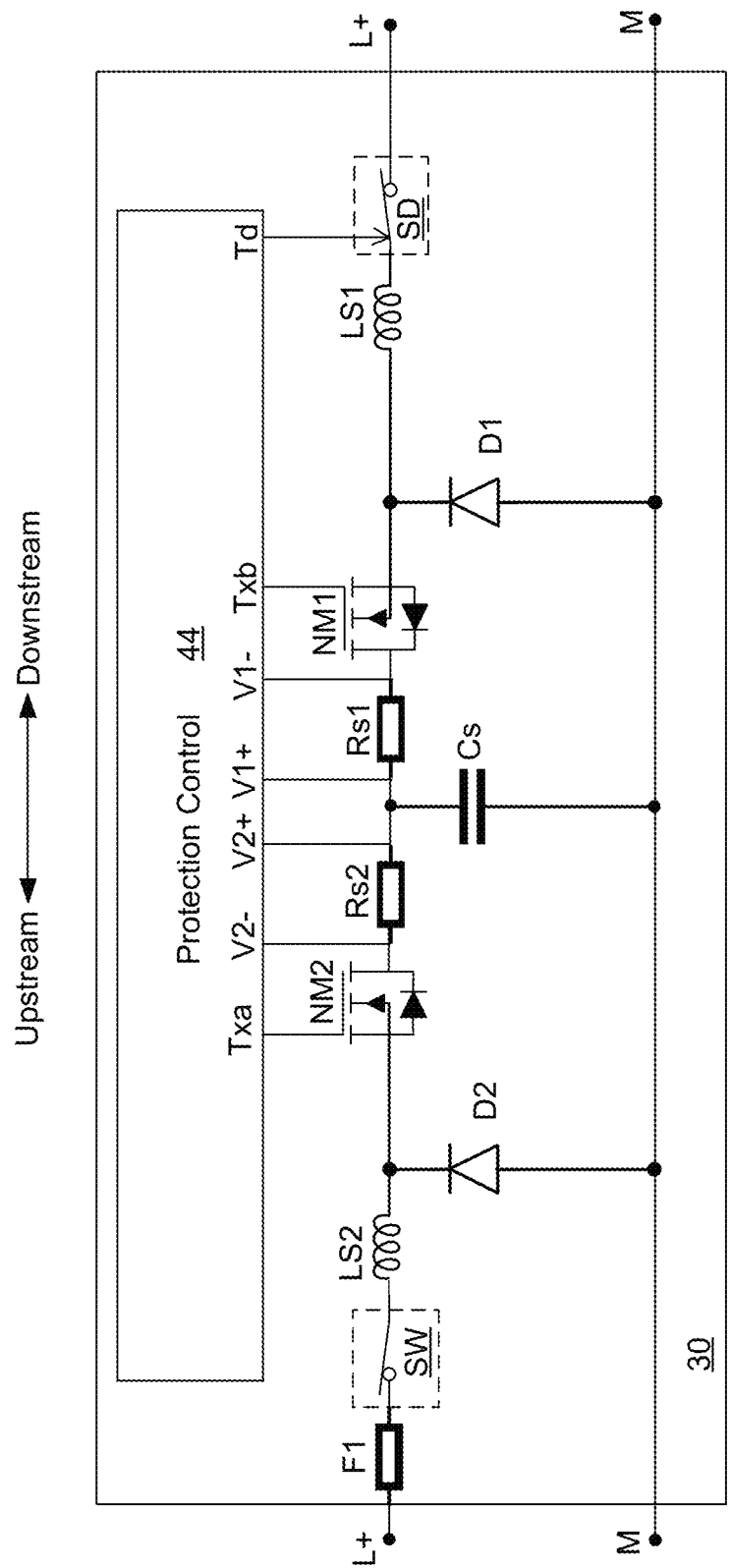
FIGS. 3A-3E schematically depict various illustrative bidirectional SSPDs, in accordance with some embodiments of the present disclosure.

As shown in FIGS. 3A-3D, an optional switch SW may be implemented as a manually activated switch to, for example, facilitate installation of SSPD 30, with SW being in the open position during installation and subsequently being manually closed by an installer once SSPD 30 powers up and is enabled for protection (e.g., after pre-charging capacitor Cs). In various embodiments, switch SW alternatively may be implemented equivalently to switch SD. More specifically, for example, FIG. 3E depicts an illustrative embodiment that comprises corresponding switches SD1 and SD2 (e.g., a relays) under control of protection control circuit 44 (via outputs Td1 and Td2, respectively) such that switch SD2 (SD1) is opened after NM2 (NM1) is opened in response to an upstream (downstream) overcurrent condition (e.g., short-circuit or overload), thereby providing for essentially complete mirroring of the upstream and downstream protection circuitry such that an overcurrent (e.g., short circuit) on any one of the upstream and downstream sides of the protection circuit is completely isolated from the other of the upstream and downstream sides of the protection circuit.

In the illustrative embodiments of FIGS. 3A-3E, protection control circuit 44 operates analogously with respect to controlling NM2 in the event of an "upstream" overcurrent (e.g., short-circuit or overload) condition as it does with respect to controlling NM1 in the event of a "downstream" overcurrent condition, the latter operation corresponding to that described with reference to the embodiments of FIGS. 2A and 2B. For example, upon detecting an "upstream" short-circuit condition based on the voltage sensed across impedance Rs2 (e.g., sensed voltage drop from V2+ to V2− reaching or exceeding the nominal voltage drop corresponding to twice a nominal current level), protection control circuit 44 rapidly turns off transistor NM2 and—for implementations such as the illustrative embodiment of FIG. 3E—causes switching device SD2 to turn off a minimum time delay after NM2 opens. As described above for unidirectional protection devices, the delay between NM2 opening and SD2 subsequently opening may be based on, for example, a predetermined minimum delay (e.g., which may correspond to the difference in the switching times of NM2 and SD2), and/or protection control circuit 44 sensing that the free-wheeling current through D2 has decreased below a threshold level.

And similar to as described with respect to unidirectional embodiments of, e.g., FIGS. 2A and 2B, capacitor Cs in the illustrative FIGS. 3A-3E embodiments is configured to provide the short-circuit current required to trip SSPD 30 based on an overcurrent event in the "downstream" direction (e.g., opening NM1) as well as in the "upstream" direction (e.g., opening NM2), thereby providing for complete bidirectional selectivity, with all the current remaining local such that "upstream" sources in the event of a "downstream" short-circuit and "downstream" sources in the event of an "upstream" short-circuit are not affected and do not contribute to the short-circuit current. As such, for power flow in either direction, a load-side fault (e.g., short circuit) will not cause tripping of source-side protection devices (nor damage to other source-side components). In other words, for power flow in either direction, bidirectional SSPD 30 isolates a load-side short-circuit fault to the load side, thereby providing complete selectivity.

Figure 3B:
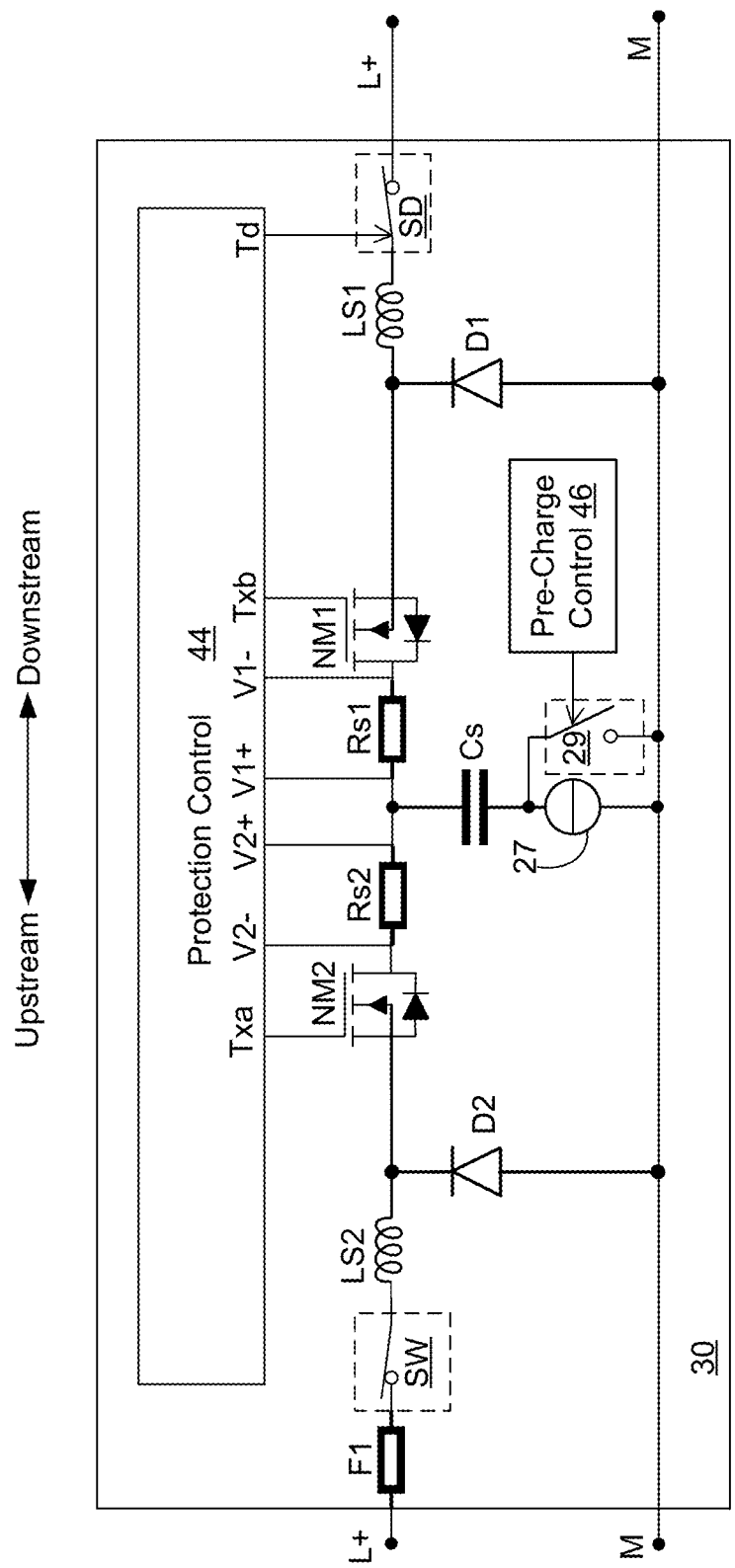

FIG. 3B illustrates an alternative illustrative embodiment of a SSPD 30, in accordance with some embodiments. As shown, the illustrative SSPD 30 embodiments of FIG. 3A and FIG. 3B are essentially identical, except for SSPD 30 of FIG. 3B (similar to SSPD 20 of FIG. 2B) including circuitry for pre-charging capacitor Cs; namely, current sink circuitry 27, shunt switch 29, and pre-charge control circuitry 46. It may be understood that pre-charge control circuitry 46, and possibly also shunt switch 29 and/or current sink circuitry 27, may be integrated as part of protection control circuit 44. In operation, upon power-up of SSPD 30 (e.g., following installation), prior to SSPD 30 being enabled for protection, shunt switch 29 is in the open state and capacitor Cs is charged through current sink circuitry 27 to the nominal DC bus voltage between L+ and M terminals. Upon capacitor Cs being charged to the nominal DC bus voltage, pre-charge control circuit 46 causes shunt switch 29 to close, and protection control circuit 44 is enabled to control NM1 and NM2 (and SD) in response to the signals sensed across impedances Rs1 and Rs2 at inputs V1+/V1− and inputs V2+/V2−, respectively.

Figure 3C:
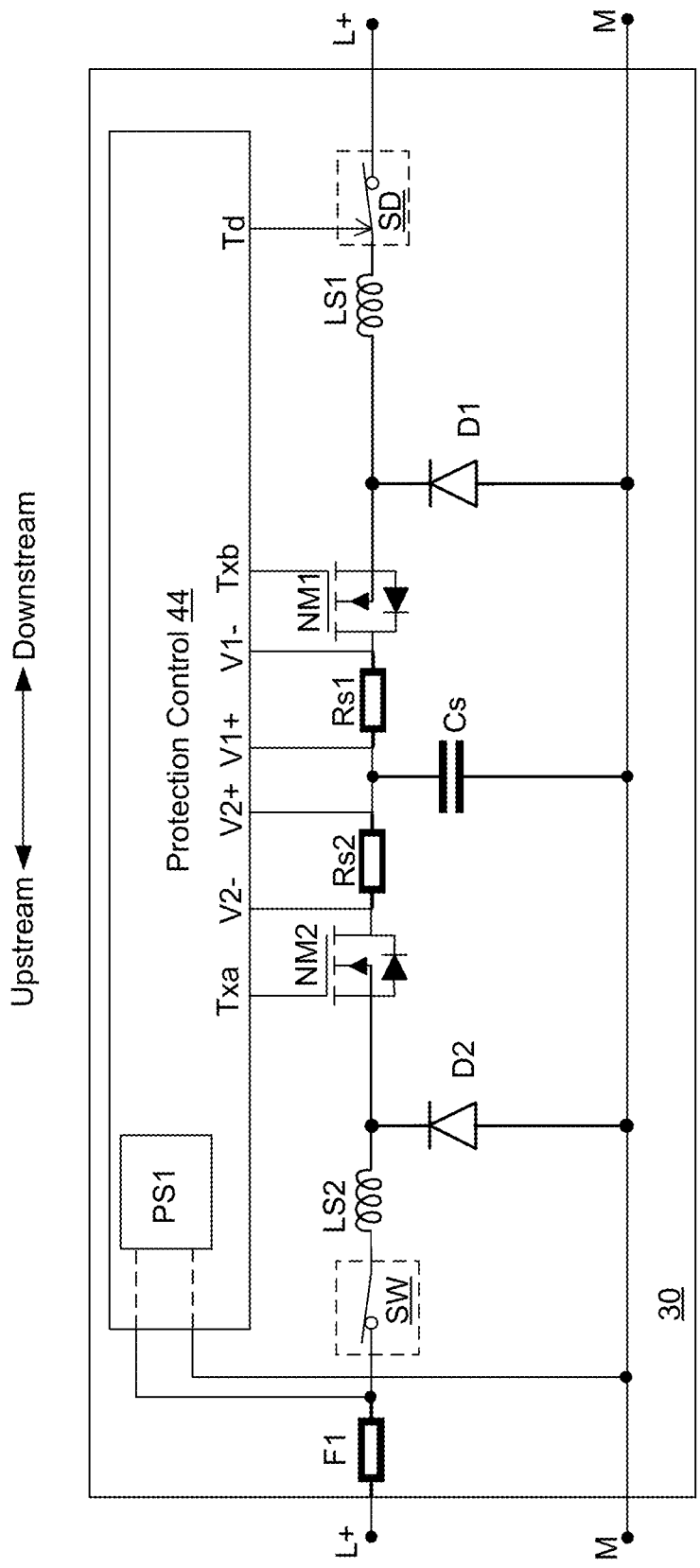

FIG. 3C depicts an illustrative embodiment of SSPD 30, and may, for example, correspond to an embodiment according to FIG. 3A or FIG. 3B (despite FIG. 3C not expressly depicting pre-charge circuitry). More specifically, in the illustrative embodiment of FIG. 3C, power supply circuitry PS1 that supplies power to protection control circuitry 44 (and to pre-charge control circuit 46) is supplied from only an "upstream" source. In some implementations, for example, power supply circuitry PS1 may comprise a switch-mode buck converter. As may be appreciated, having protection control circuitry 44 supplied from only the "upstream" side may preclude or impair full, bidirectional selectivity. In some embodiments, however, power supply circuitry PS1 may provide sufficient isolation (e.g., galvanic) and power storage such that, after an upstream short-circuit condition occurs, protection control circuit 44 may be supplied for a sufficient time (e.g., so-called hold-up time) to safely turn off transistor NM2 and, in some cases, also open switching device SD. Protection control circuit 44 may further be configured such that at least NM2 is OFF (e.g., its gate pulled to ground potential) when the protection control circuit 44 lacks sufficient power.

Figure 3D:
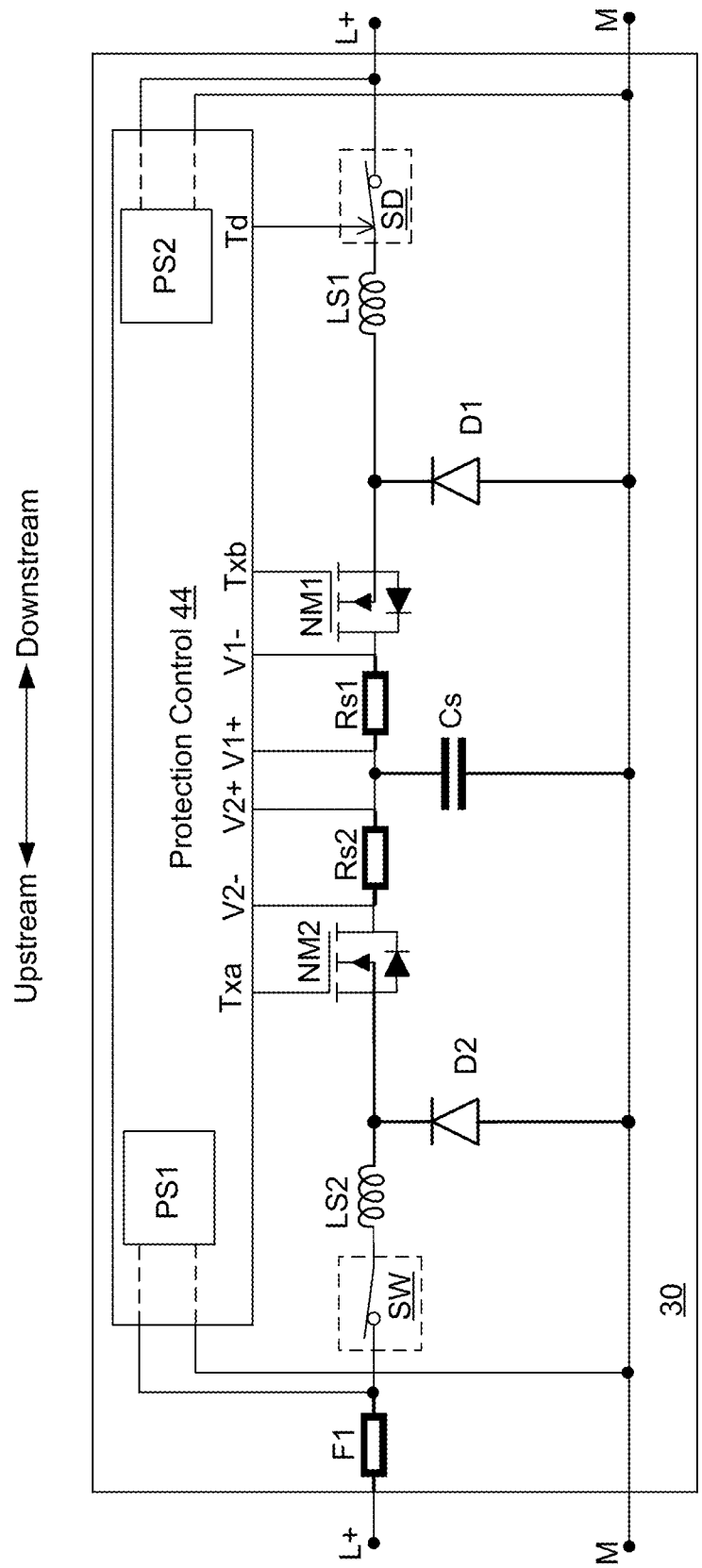
Figure 3E:
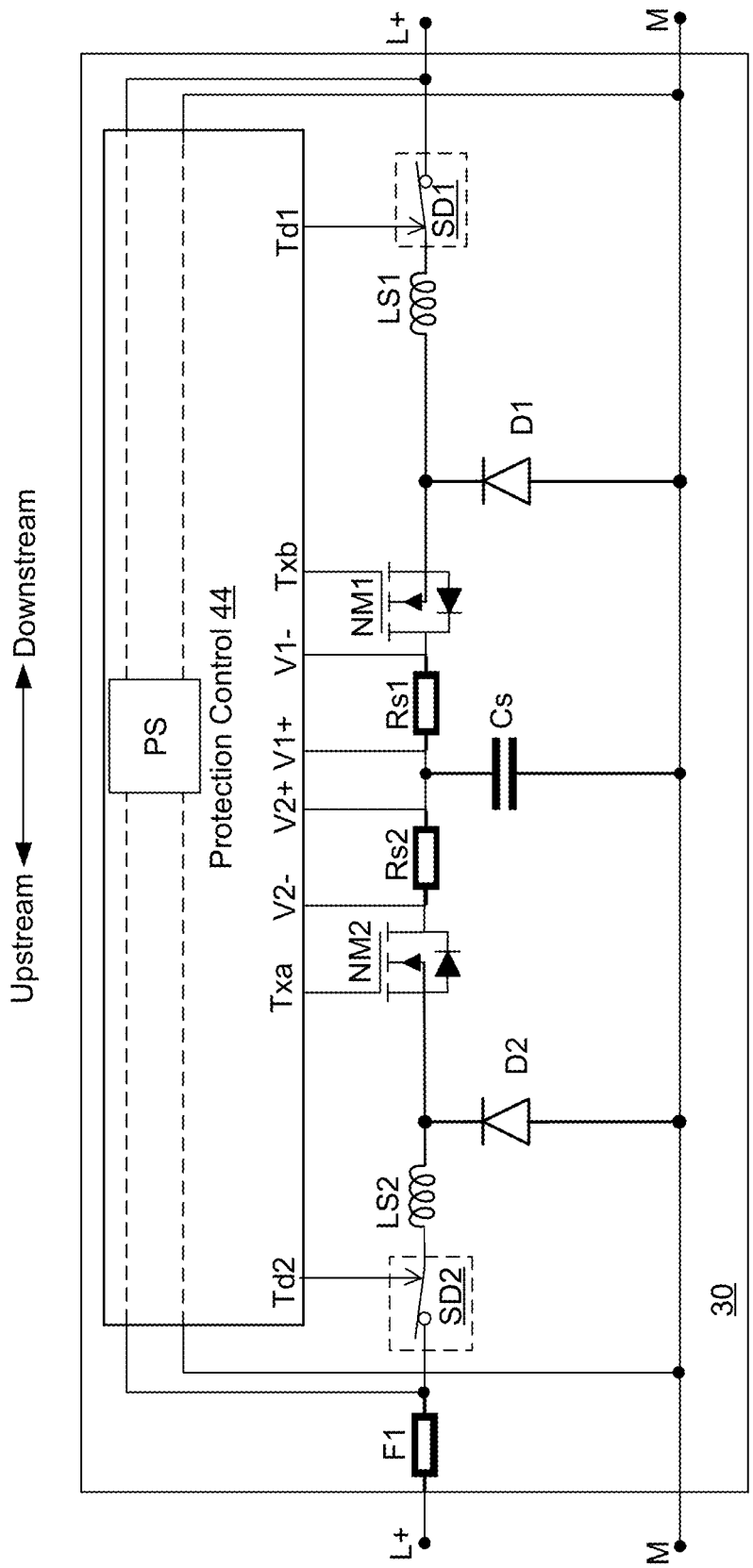

FIG. 3D depicts a further illustrative embodiment of SSPD 30, and may, for example, correspond to an embodiment according to FIG. 3A or FIG. 3B (despite FIG. 3D not expressly depicting pre-charge circuitry). More specifically, in the illustrative embodiment of FIG. 3D, protection control circuitry 44 includes power supply circuitry PS1 and power supply circuitry PS2, such that protection control circuitry 44 (and, e.g., pre-charge control circuit 46) may be independently supplied via power supply circuitry PS1 from an "upstream" source and via power supply circuitry PS2 from a "downstream" source. In some embodiments, such as the illustrative embodiment of FIG. 3E, power control circuitry 44 may be powered by a common power supply circuit PS that is independently supplied from an "upstream" source and a "downstream" source, with power supply circuit PS configured such that it may operate normally and supply continuous power to protection control circuit 44 in the event of a fault (e.g., short-circuit) on one of the upstream and downstream L+/M ports. As such, each of the illustrative embodiments of SSPD 30 according to FIGS. 3D and 3E provides fully bidirectional and selective protection, wherein both the upstream and downstream portions of SSPD 30 are capable of operating independently.

For clarity, it is noted that (as indicated above) the illustrative embodiments of FIGS. 3C-3E may also include circuitry for pre-charging capacitor Cs, such as the current sink circuitry 27, shunt switch 29, and pre-charge control circuitry 46.

In view of the foregoing, it may be understood that a protection device (e.g. SSPD 20 or SSPD 30) in accordance with some embodiments of the present disclosure may comprise components (e.g., solid state switch, such as transistor NM1; capacitor Cs; freewheeling diode D2; protection control circuit 44, etc.) that may be integrated in a common module and/or on a common printed circuit board, and/or distributed over separate modules and/or printed circuit boards. It will also be understood that capacitor Cs may be implemented as a single capacitor component or as a plurality of capacitor components (e.g., connected in parallel). In view of the foregoing, it will also be understood that various embodiments of a protection device in accordance with the present disclosure may include additional components or circuitry. For instance, some embodiments of a protection device in accordance with the present disclosure may also include voltage protection circuitry (e.g., crowbar circuitry provided between the downstream L+ and M terminals in illustrative SSPD 20 of FIGS. 2A and 2B).

Figure 4:
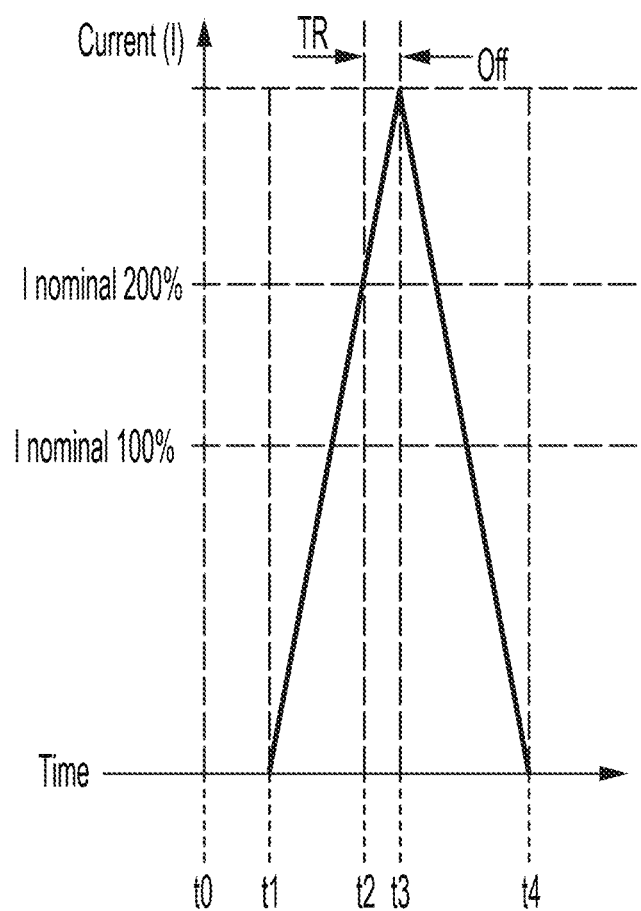
FIG. 4 depicts an illustrative plot of load current versus time for a short-circuit condition as protected by any of the SSPDs of FIGS. 2A-B and FIGS. 3A-3E, in accordance with some embodiments of the present disclosure.

FIG. 4 depicts by way of non-limiting example an illustrative plot of load current versus time for a downstream short-circuit condition as protected by any of SSPDs 20 and 30 of FIGS. 2A-B, and FIGS. 3A-3E. More specifically, in this illustrative non-limiting example, between time t0 and time t1, no current is being drawn by the load, which under normal, nominal operating conditions would conduct a nominal current at a level depicted in FIG. 4 as I nominal 100%. At time t1, a short-circuit condition occurs downstream (e.g., L+ and M shorted). Accordingly, between time t1 and t2, the load current increases approximately linearly with a slope inversely proportional to the sum of inductance LS1 and the downstream system inductance. In this illustrative embodiment, protection circuit 44 is configured to detect a short-circuit condition according to the magnitude of the current sensed via impedance Rs reaching (or exceeding) a threshold level that is twice the nominal operating current of I nominal 100%; i.e., the short circuit current threshold is depicted in FIG. 4 as I nominal 200%. Between time t2 and t3 (i.e., interval TR), the short-circuit current continues to increase approximately linearly, with approximately the same slope, as protection circuit 44 detects the short circuit condition and causes transistor NM1 to be driven to its OFF (open) state, which is achieved at time t3, at which time the current conducted to the load via inductor LS1 is commutated to free-wheeling diode D1, and the load current decreases approximately linearly between time t3 and t4. FIG. 4 also indicates that according to the design and operation of SSPD 20, SSPD 30 and associated protection control circuit 44, the current (and voltage) conditions remain in the safe operating area (SOA) of transistor NM1 (and NM2).

More specifically it will be understood that time interval TR includes (i) the time for protection circuitry 44 to detect a short-circuit condition and generate an output signal (e.g., at Tb) to drive the gate of NM1 to an off-state voltage level, as well as (ii) the switching time of transistor NM1 (i.e., the time between the gate being driven to an off voltage level and the channel of transistor NM1 turning off (i.e., switching from a low impedance state to a high impedance state). Generally, this intrinsic delay TR may depend on the circuit design and transistor technology node of the protection control circuit 44 as well as on the type of current-breaking device employed (e.g., an IGFET such as the depicted transistors NM1 and NM2 of the illustrative embodiments, or an IGBT, etc.). By way of non-limiting example, in some implementations, TR may be in the range of about one to about ten microseconds, whereas in some implementations TR may be less than one microsecond, such as in the range of about 100 ns to about 500 ns. It will be understood that determining an appropriate inductance (LS, LS1, LS2) may be based on limiting the maximum short-circuit current that can be reached over the TR interval to prevent degradation or destruction of any components (e.g., NM1) of the SSPD.

As described, capacitor Cs has sufficient capacity (stored charge) such that it supplies the short-circuit current at least between time t2 and t3, and preferably between time t1 and time t3. In other words, capacitor Cs stores a charge equal to at least the time integral of the current between time t2 and t3, and preferably equal to at least the time integral of the current between time t1 and t3. Such charge capacity of Cs ensures that SSPD 20 and 30 provide full selectivity. As described, capacitor Cs may be implemented as one or more capacitor components. In some embodiments, capacitor Cs may be implemented as a capacitor bank comprising a plurality of capacitors (of equal and/or different capacitances) that may be selectively connected (e.g. using transistor switches under control of control circuit 44) in, e.g., parallel to provide a desired value of Cs.

Figure 5:
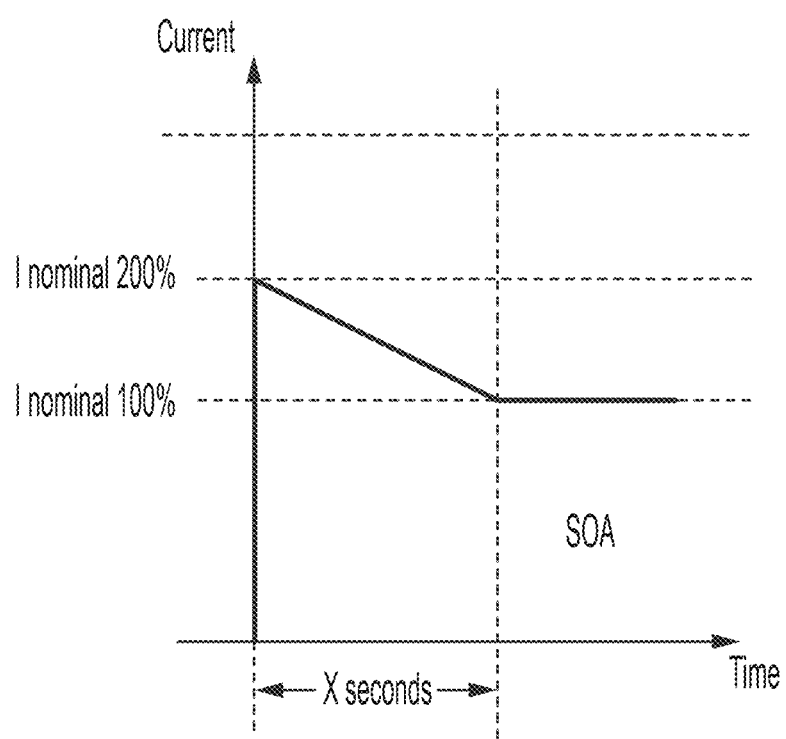
FIG. 5 depicts an illustrative current-time curve corresponding to an overcurrent protection control scheme as may be implemented by any of the SSPDs of FIGS. 2A-B and FIGS. 3A-3E, in accordance with some embodiments of the present disclosure.

FIG. 5 depicts an illustrative, non-limiting example of a current-time curve (e.g., an inverted, linear-scaled (e.g., non-logarithmic) time-current curve) corresponding to an overcurrent protection control scheme as may be implemented by protection control circuit 44 of SSPD 20 and/or SSPD 30. For instance, as illustrated, if the sensed current equals or exceeds 200% of the SSPD's nominal rated current (the latter denoted in FIG. 5 as I nominal 100%), then this condition is considered a short-circuit, and protection control circuit 44 will cause SSPD 20 (SSPD 30) to rapidly break (i.e., cause transistor NM1 or NM2 to open, either as rapidly as possible or with a small controlled delay, as may be desired, for example, to facilitate selectivity relative to a downstream protection device). Such rapid switching may occur, for example, within several microseconds, or within a microsecond, such as in about one-half microsecond, or possibly less. For currents sensed from between I nominal 100% to I nominal 200%, this condition is considered an overload, and protection control circuit 44 will permit the overload current to conduct for a period of time that, as shown, varies approximately linearly from about X seconds for a current somewhat above I nominal 100% to nearly instantaneously (e.g., within milliseconds or microseconds) for a current somewhat below I nominal 200%. The value of X (e.g., which, by way of non-limiting example, might be several seconds, or between 10 and 20 seconds, or greater than 20 seconds) and definition or partitioning of the trip-curve for the overload condition may depend on thermal design and dissipation considerations (e.g., thermal degradation of transistor characteristics). As shown, a safe operating area (SOA) corresponds to the region at or beneath the current-time control scheme curve.

Accordingly, upon detecting a short-circuit condition (e.g., based on an analog comparator), protection control circuit 44 rapidly turns off transistor NM1 (or NM2). And upon detecting an overload condition, protection control circuit 44 may turn off transistor NM1 (or NM2) after a time delay that may be a function of the magnitude of the overload current, so as to prevent overheating of transistor NM1 and/or transistor NM2 (and/or the free-wheeling diode (s)) that may cause degradation or failure thereof. More specifically, for example, in various embodiments, at least one sample—and, e.g., possibly multiple, periodic samples—of an overload current may be digitally sampled by protection control circuit 44, and the time at which transistor NM1 (or NM2) will be turned off may be based on the magnitude(s) of the overload current sample(s) in view of pre-characterization of the power and/or energy dependent (e.g., current magnitude and/or duration dependent) heating and degradation properties of transistors corresponding to transistor NM1 (and/or NM2). It will further be understood that specifying a short-circuit condition as being nominally twice the nominal load current under normal operating conditions is arbitrary and by way of non-limiting example; e.g., the short-circuit condition may be defined in different ways depending on the implementation.

It is again noted that an SSPD in accordance with the foregoing illustrative embodiments of FIGS. 2A-2B, and 3A-3D are configured such that in the event that a short-circuit occurs on a load side, capacitor Cs has sufficient capacity such that it provides the short-circuit current required to trip the SSPD 20 or SSPD 30. As such, the short-circuit condition does not propagate through or beyond SSPD 20 or SSPD 30; thus, for example, a load-side short-circuit condition will not cause tripping of source-side protection devices (nor cause damage to other upstream components). In other words, SSPDs 20 and 30 each isolates a load-side short-circuit fault to the load side, thereby providing complete selectivity.

Figure 6:
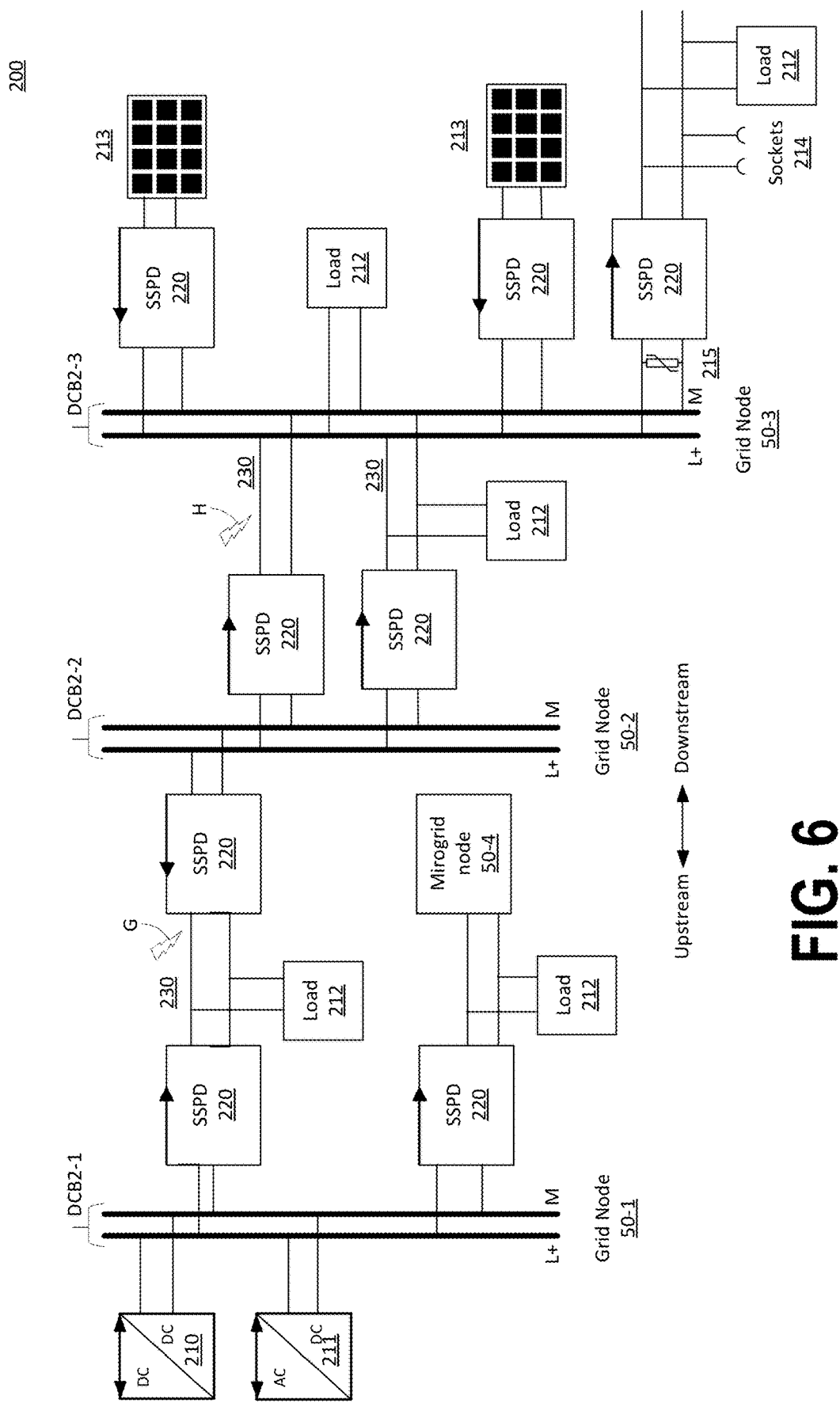
FIG. 6 schematically depicts a block diagram of an illustrative DC microgrid meshed system employing uni-directional solid state protection devices (SSPDs) according to various embodiments of the present disclosure.

FIG. 6 schematically depicts another illustrative embodiment of a DC microgrid meshed system 200 including uni-directional SSPDs 220 only, in accordance with some embodiments of the present disclosure. As shown in FIG. 6, illustrative meshed system 200 comprises a first microgrid node 50-1, a second microgrid node 50-2 and a third microgrid node 50-3. The microgrid nodes 50-1, 50-2, 50-3 may be different.

Illustrative microgrid node 50-1 comprises two sources configured to supply DC power to a main DC bus DCB2-1, which is configured to distribute DC power to various loads. As depicted, one of the sources supplying power to bus DCB2 is an alternating current (AC) power source coupled to DCB10 via a bidirectional AC/DC converter 211. Another power source is a direct current (DC) power source coupled to DCB10 via a bidirectional DC/DC converter 210.

Power from bus DCB2-1 may be distributed to various loads, such as illustratively depicted loads 212. More specifically, in this illustrative embodiment, power from bus DCB2-1 is distributed to loads 212 via a uni-directional SSPD 220.

Some or all of the loads 212 may be also connected to the second microgrid node 50-2 or other nodes, such as 50-4, via DC branches. A DC branch 230 connects electrically two different microgrid nodes of the meshed system 200, the ends of the branch being connected to the microgrid nodes. Branches may be different, and more particularly comprise a number of loads/sources of various types.

As still depicted in FIG. 6, a branch 230 connects the first microgrid node 50-1 and the second microgrid node 50-2, comprising two uni-directional SSPD 220 and a load 212. Another branch 230 connects a load and another microgrid node 50-4 to DC bus DCB2-1. Illustrative second microgrid node 50-2 comprises a second DC bus DCB2-2, which is configured to distribute DC power by being connected to the first DC bus DCB2-1 via the branch 230 and to a third DC bus DCB2-3 and/or various sources/loads. As shown, two DC branches 230 also connect the second microgrid node 50-2 and the third microgrid 50-3 node. Third DC bus DCB2-3 can likewise distribute power to various sources/loads, such as illustratively depicted loads 212, solar panels 213, or sockets 214 for charging batteries.

It will be understood that, depending on the implementation, various alternative and/or additional sources and/or alternative source configurations may be implemented, with power sources comprising any of various renewable and/or non-renewable energy sources. SSPDs 220 may all have the same configuration of electrical components and electronics, though the current rating (e.g., corresponding to the short-circuit threshold current) of different SSPDs may differ according to the nominal source and/or load current characteristics of the respective source and/or load to which the respective SSPDs are connected. Besides, a microgrid meshed system can have different arrangements and multiple branches for DC power to flow among microgrid nodes in one or both directions. Each microgrid node can be connected directly to several other nodes, or only some nodes connect directly to one another. In some cases, a microgrid node must go through another node to reach another microgrid node.

Location of uni-directional SSPDS oriented to protect the microgrid meshed system in a given power flow direction (as shown by the uni-directional arrows), in particular at each end of branches connecting microgrid nodes allows to provide an appropriate strategy for network protection by clearing faults (e.g., overcurrent conditions) with selectivity, even when DC power may flow in both direction in the system. Thus, for example, a fault G on branch 230 causes tripping both SSPDs 220 at each end of said branch, the short-circuit being isolated from the microgrid nodes 50-1 and 50-2. Similarly, a fault H will cause only the immediately upstream SSPD 220 to trip, so that said branch disconnects from microgrid node 50-2. Downstream, fault causes tripping of SSPDs 220 that are directly coupled to bus DCB2-3 and also connected to solar panels 213. SSPD 220 connected to sockets 214 and load 212 will not trip but a diode 215 prevents current to flow upstream. When the voltage of DC bus DCB2-3 drops, said SSPD 220 connecting the sockets 214 and load 212 will also open because it will no longer have power supply when microgrid node 50-3 is disabled. However, microgrid nodes 50-2 (and 50-1) remain fully operational.

From illustrative embodiment of FIG. 6, it thus appears that using uni-directional SSPDs is sufficient to effectively protecting the microgrid meshed system without sacrificing selectivity by isolating a given microgrid node where the fault occurs while letting the other nodes be operational. More particularly, uni-directional SSPDs can substitute or replace bi-directional SSPDs which usually requires more components (e.g., semiconductors) and are therefore more costly. It also allows to halve the losses, since only one electronic switch is needed in a uni-directional SSPD while two anti-series switches are necessary in a bi-directional SSPD.

Although the above description of illustrative embodiments of the present invention, as well as various illustrative modifications and features thereof, provides many specificities, these enabling details should not be construed as limiting the scope of the invention, and it will be readily understood by those persons skilled in the art that the present invention is susceptible to many modifications, adaptations, variations, omissions, additions, and equivalent implementations without departing from this scope and without diminishing its attendant advantages. For instance, the structure and/or function of a component may be combined into a single component or divided among two or more components. In addition, it is specifically contemplated that a particular feature described, either individually or as part of an embodiment, can be combined with other individually described features, or parts of other embodiments. It is further noted that the terms and expressions have been used as terms of description and not terms of limitation. There is no intention to use the terms or expressions to exclude any equivalents of features shown and described or portions thereof. Additionally, the present invention may be practiced without necessarily providing one or more of the advantages described herein or otherwise understood in view of the disclosure and/or that may be realized in some embodiments thereof. It is therefore intended that the present invention is not limited to the disclosed embodiments but should be defined in accordance with claims that are based on the present disclosure, as such claims may be presented herein and/or in any patent applications claiming priority to, based on, and/or corresponding to the present disclosure.

The invention claimed is:

1. A DC protection device, comprising:
    an input port comprising a first upstream positive line terminal and a first upstream negative line terminal for coupling to a DC power source;
    an output port comprising a first downstream positive line terminal and a first downstream negative line terminal;
    at least one solid state switching device each coupled in series between the first upstream positive line terminal and first downstream positive line terminal, each of the at least one solid state switching device having a first terminal, a second terminal, and a third terminal operable to selectively cause the at least one solid state switching device to switch between (i) a closed state in which the first terminal is conductively coupled by a low impedance to the second terminal, and (ii) an open state comprising a high impedance between the first terminal and the second terminal;
    a control circuit configured (i) to sense a current conducted between the first upstream positive line terminal and the first downstream positive line terminal, and (ii) to selectively cause each of the at least one solid state switching device to switch between the closed state and the open state;
    a capacitor coupled to each of the at least one solid state switching device and configured to store a charge such that, in the event of a short-circuit condition with respect to at least one of the first upstream positive line terminal and the first downstream positive line terminal, the capacitor is configured to supply, via one of the at least one solid state switching device, a short-circuit current required to switch the at least one solid state switching device to the open state;
    a pre-charge circuitry configured to pre-charge the capacitor prior to the DC protection device being enabled;
    a diode having its cathode coupled between the at least one solid state switching device and the first downstream positive line terminal and its anode coupled to the first downstream negative line terminal, wherein the diode is configured to act as a free-wheeling diode to carry a current when the at least one solid state switching device is switched to the open state; and
    an electromechanical switch coupled in series between the cathode of the diode and the first downstream positive line terminal,
    wherein the control circuit, in response to sensing that the current conducted via one of the at least one solid state switching device satisfies a threshold current level qualifying as the short-circuit condition, causes the at least one solid state switching device to switch between the closed state and the open state so as to generate an open circuit condition between the first upstream positive line terminal and the first downstream positive line terminal; and
    wherein the control circuit is configured to cause the electromechanical switch to switch from a closed state to an open state at a time delay after the control circuit causes the at least one solid state switching device to switch between the closed state and the open state and the free- wheeling current through the diode has decreased below a nominal level.

2. The DC protection device according to claim 1, wherein the DC protection device is configured as a unidirectional protection device.

3. A meshed microgrid system comprising multiple DC nodes electrically connected with each other by branches, each end of a branch being connected to a node via a unidirectional protection device according to claim 2.

4. The DC protection device according to claim 1, wherein the DC protection device is configured as a bidirectional protection device capable of providing protection against the short-circuit condition on any one of the first upstream positive line terminal and the first downstream positive line terminal.

5. The DC protection device according to claim 1, wherein the control circuit is configured to be independently supplied with power from both the first upstream positive line terminal and the first downstream positive line terminal.

6. The DC protection device according to claim 1, further comprising at least one inductor coupled in series between the first upstream positive line terminal and first downstream positive line terminal and configured to limit a rate of change of the short-circuit current.

7. The DC protection device according to claim 1, wherein the capacitor is configured from selective coupling of individual capacitors of a capacitor bank.

8. A DC protection device, comprising:
    a first upstream terminal for coupling to a DC power source;
    a first downstream terminal;
    at least one solid state switching device each coupled in series between the first upstream terminal and first downstream terminal, each of the at least one solid state switching device having a first terminal, a second terminal, and a third terminal operable to selectively cause the at least one solid state switching device to switch between (i) a closed state in which the first terminal is conductively coupled by a low impedance to the second terminal, and (ii) an open state comprising a high impedance between the first terminal and the second terminal;
    a control circuit configured (i) to sense a current conducted between the first upstream terminal and the first downstream terminal, and (ii) to selectively cause each of the at least one solid state switching device to switch between the closed state and the open state; and a capacitor coupled to each of the at least one solid state switching device and configured to store a charge such that, in the event of a short-circuit condition with respect to at least one of the first upstream and first downstream terminals, the capacitor is configured to supply, via one of the at least one solid state switching device, a short-circuit current required to switch the at least one solid state switching device to the open state, wherein the control circuit, in response to sensing that the current conducted via one of the at least one solid state switching device satisfies a threshold current level qualifying as the short-circuit condition, causes the at least one solid state switching device to switch between the closed state and the open state so as to generate an open circuit condition between the first upstream terminal and the first downstream terminal; and wherein the control circuit is configured to be independently supplied with power from both the first upstream terminal and the first downstream terminal.

9. The DC protection device according to claim 8, wherein the DC protection device is configured as a unidirectional protection device.

10. The DC protection device according to claim 8, wherein the DC protection device is configured as a bidirectional protection device capable of providing protection against the short-circuit condition on any one of the first upstream terminal and the first downstream terminal.

11. The DC protection device according to claim 8, further comprising at least one inductor coupled in series between the first upstream terminal and first downstream terminal and configured to limit a rate of change of the short-circuit current.

12. The DC protection device according to claim 8, further comprising a pre-charge circuitry configured to pre-charge the capacitor prior to the DC protection device being enabled.

13. The DC protection device according to claim 8, wherein the capacitor is configured from selective coupling of individual capacitors of a capacitor bank.

14. The DC protection device according to claim 8, further comprising an electromechanical switch coupled in series between the first upstream terminal and first downstream terminal, wherein the control circuit is configured to cause the electromechanical switch to switch from a closed state to an open state at a time delay after the control circuit causes the at least one solid state switching device to switch between the closed state and the open state.

15. The DC protection device according to claim 8, further comprising at least one diode configured to conduct load current after the control circuit causes the at least one solid state switching device to switch between the closed state and the open state.

16. A meshed microgrid system comprising multiple DC nodes electrically connected with each other by branches, each end of a branch being connected to a node via a unidirectional protection device according to claim 9.

* * * * *